April 29, 1952 R. L. JAESCHKE 2,594,931
DYNAMOELECTRIC APPARATUS
Filed Jan. 14, 1950 2 SHEETS—SHEET 1

Ralph L. Jaeschke,
Inventor.
Haynes and Koenig,
Attorneys.

April 29, 1952     R. L. JAESCHKE     2,594,931
DYNAMOELECTRIC APPARATUS

Filed Jan. 14, 1950     2 SHEETS—SHEET 2

Patented Apr. 29, 1952

2,594,931

UNITED STATES PATENT OFFICE 2,594,931

DYNAMOELECTRIC APPARATUS

Ralph L. Jaeschke, Kenosha, Wis., assignor to Dynamatic Corporation, Kenosha, Wis., a corporation of Delaware Application January 14, 1950, Serial No. 138,646

12 Claims. (Cl. 172—284)

This invention relates to dynamoelectric apparatus and more particularly to air-cooled eddy-current slip couplings, clutches, brakes and the like having improved heat dissipation characteristics and heat dissipation units therefor.

Briefly, this invention includes a novel heat dissipating means for flexible inductor members of dynamoelectric apparatus which comprises an arcuate section of accordion pleated or accordion folded metal strip or the like allowing flexing, and permitting axial air flow; improved inductor members which include such heat dissipating units as heat conductive heat bonded parts, and dynamoelectric apparatus having a novel cooling arrangement including said improved inductor member.

Among the several objects of this invention may be noted the provision of heat dissipating units for dynamoelectric apparatus having flexible segmental inductor drums, which may be conveniently assembled with inductor members of various capacities to increase the heat dissipation characteristics thereof; the provision of heat dissipating units of the type described which are inexpensive to manufacture; and the provision of inductor members for dynamoelectric apparatus which have increased heat dissipation characteristics for a given size. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a longitudinal section showing an eddy-current coupling embodying the invention;

Similar reference characters indicate corresponding parts throughout the several views of the drawings.

Figure 1:
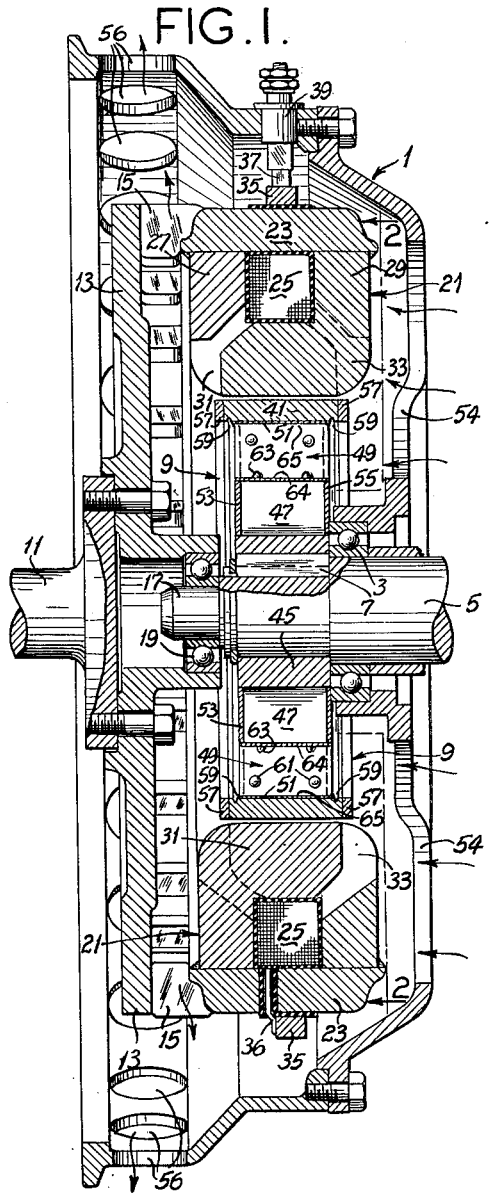
Figure 3:
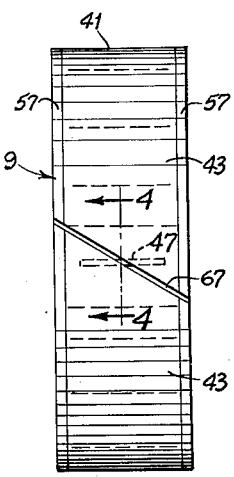
Fig. 3 is a surface view of the rim of an inductor member shown in Figs. 1 and 2.
Figure 4:
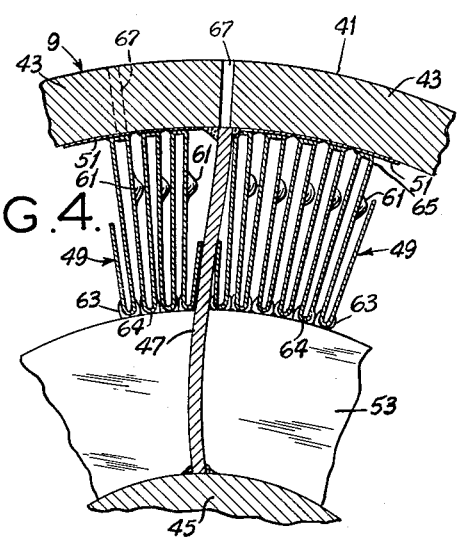
Fig. 4 is an enlarged cross section taken on line 4—4 of Fig. 3.
Figure 6:
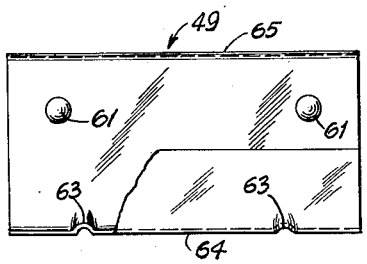
Fig. 6 is a right-hand view of Fig. 5.

Referring now more particularly to Fig. 1 there is shown by way of example at numeral 1 a clutch housing wherein is journalled by means of a bearing 3, an end of a driven shaft 5. Keyed to shaft 5, as indicated at numeral 7, is an inductor member 9 made according to this invention. A driving shaft 11 carries a flywheel 13 which has integrally formed fan impellers 15 peripherally arranged thereon. The reduced end 17 of driven shaft 5 is journalled in a pilot bearing 19. An annular field member generally designated at numeral 21 is affixed to flywheel 13.

Field member 21 includes a drum 23 which carries on its inner periphery an annular field coil 25 and a pair of magnetic (iron) rings 27 and 29 which are, respectively, formed with spaced magnetic claw-type teeth or poles 31 and 33. These teeth are interdigitated, point in opposite directions and embrace coil 25. Similar teeth and the above field member construction are described in greater detail in U. S. Patent 2,470,596, dated May 17, 1949.

Drum 23 carries on its outer periphery a slip ring 35 having an insulated electrical connection 36 to field coil 25. The field coil circuit is completed by ground connections through drum 23 and flywheel 13. Current to energize the field is conducted to ring 35 by means of brush 37 which is insulated from frame 1 as indicated by bushing 39.

Figure 2:
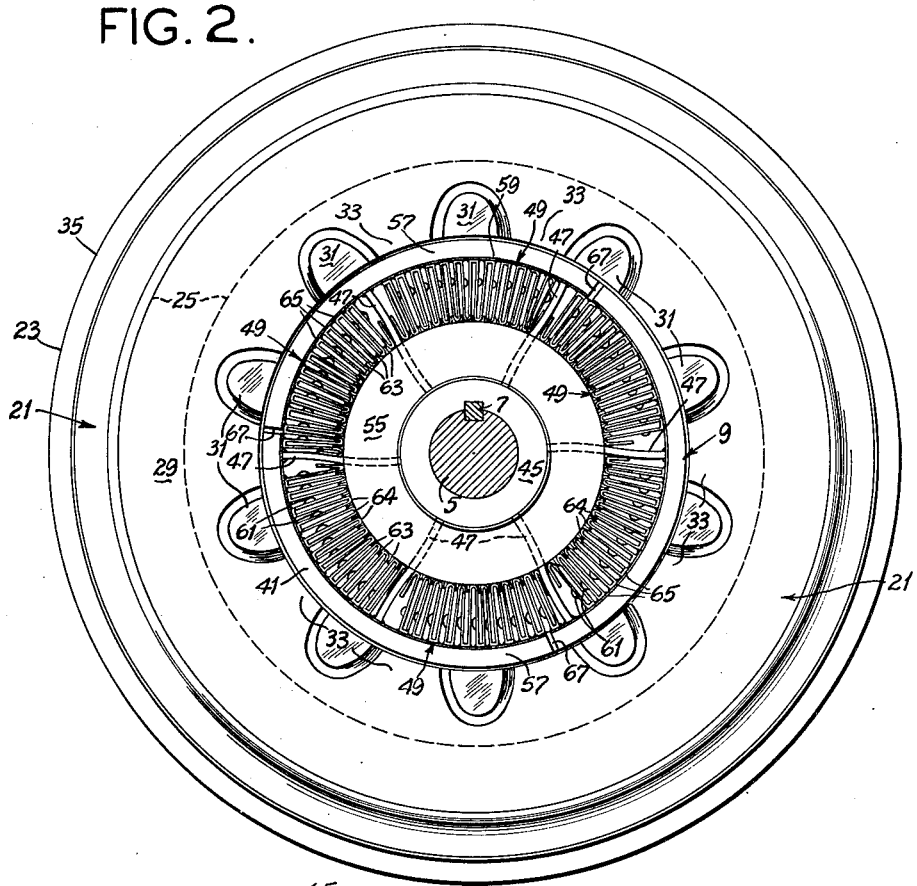
Fig. 2 is a cross section taken on line 2—2 of Fig. 1.

The inductor member 9 includes a discontinuous cylindric inductor drum 41 comprising a series of spaced inductor drum segments 43 which are preferably formed of homogeneous magnetic material such as soft steel. These segments are supported upon a hub 45 by means of welded ribs or spokes 47 which as shown, particularly in Fig. 2, are in the form of S-shaped webs. Between these ribs 47 are affixed heat dissipating units indicated generally at reference numeral 49. The outer peripheral folded edges of units 49 are affixed by a layer of solder or brazing material 51 to the interior of drum 41. The resulting heat bonded connections are highly heat conductive. A pair of baffles 53 and 55 are affixed to hub 45. These baffles have a circumference of approximately the same dimensions as the circle formed by the inner peripheries of units 49 but no heat bonded connections are formed at the inner folds of units 49. The housing 1 is provided with a plurality of air inlets as indicated at 54, in addition to exit apertures 56. The inductor member includes a pair of copper end rings 57 brazed to the edges of inductor drum 41.

Figure 5:
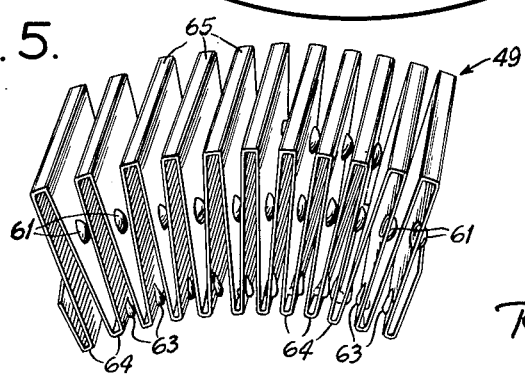
Fig. 5 is an isometric view of a heat dissipator of the invention.

The heat dissipators 49 are preferably formed of copper or other metal of high heat conductivity. Each unit 49 preferably comprises a rectangular strip of metal which has been formed into an accordion pleated or corrugated section having a general arcuate contour (Fig. 5). These units possess sufficient accordion-like compressibility to be conveniently inserted between ribs 47. Drum 41 preferably has grooves 59 cut into its inner surface so that the units 49 may be crimped into a fixed position preparatory to brazing or welding to drum 41.

The corrugations of unit 49 are formed so as to be spaced apart when either compressed or uncompressed. Spacers comprising integral bosses 61 and indentations 63 are formed near the outer peripheral folded edges 65 and in the inner peripheral folded edges 64, respectively, so as to maintain even spacing between the corrugations when compressed. The relative sizes of these spacers are so selected as to provide a wider spacing at the outer periphery than at the inner one, so that heat dissipators 49 will assume an arcuate shape even when compressed. The upper peripheral folded edges 65 are approximately flat so as to be in a better heat conducting relation with the solder at this point connecting them with inductor drum 41.

The inductor drum segments are so shaped that lines of discontinuity or slots 67 therebetween are at an angle to an axial plane of said inductor member. The ribs 47 may possess some degree of flexibility so as to afford the advantages described in U. S. Patent 2,452,820, dated November 2, 1948. In the preferred embodiment illustrated, each alternate rib 47 is welded to a pair of adjacent drum segments 43 by intersecting a line of discontinuity 67. The remaining ribs are welded midway to the segments, crossing no slot 67. Thus the inductor drum is flexible in response to temperature changes, tending better to maintain a proper gap between it and the poles 31, 33, being more constant in size and circularity. Units 49, being themselves flexible, follow any flexing of the drum segments. Moreover, the S shapes minimize stresses when the drum 41 is heated independently of the hub 45 in the process of heat bonding the units 49 to the drum. Note in this respect that the inner edges 64 of units 49 are not brazed or otherwise attached to members 53 and 55.

The free unsprung arcuate length of each accordion pleated heat dissipator 49 (as illustrated in Fig. 5) is greater than the arcuate pocket-forming space between ribs 47. Hence to assemble each dissipator it is sprung in by compression from its ends. The lugs 61 and 63 determine its final arcuate shape and its minimum arcuate length. Each dissipator is sized so that under such conditions each may be axially slipped in the pocket between adjacent ribs 47 and released automatically to spring out to hold in position for subsequent easy soldering or brazing with the inductor 41 at points 65.

Thus the arcuate shaped accordion pleated heat dissipator units 49 may be easily fitted to inductor members of various sizes. Affixing them to the inductor is simple, merely requiring bonding by soldering or brazing which may conveniently be accomplished by inserting fluxed solder-compound sheets between units 49 and inductor drum 41 and thereafter heating the whole assembly of segments 43. The simplicity of attachment of several of these heat dissipator units to an inductor member is highly advantageous.

In operation shaft 11 is actuated by a motor which will cause flywheel 13 and field member 21 to rotate as a unit. When field coil 25 is energized, eddy currents are caused to flow in inductor member 41 which will in the known manner inductively couple inductor member 9 to field member 21 to drive shaft 5. Air is drawn through inlets 54 and thereafter must axially traverse the channels between the corrugations of heat dissipating units 49. Heated fluid coolant, preferably air, is discharged peripherally from blades 13 and escapes from housing 1 through exit ports 56. The heat is thus rapidly conducted away from the inductor member.

It has been found that inductor members of the present invention can safely dissipate approximately three times as much heat as conventional induction members under the same conditions of size, weight, shape and air flow.

It is to be understood that the heat dissipators 49 may be composed of good heat conducting metals other than copper, but that copper is preferable, and that these units may occupy the entire radial space between the inner periphery of the inductor drum and the outer periphery of the hub, thus dispensing with the baffles 53 and 55. Under such conditions their free inner ends 64 would be at the hub 45.

It is also to be noted that the thickness of the sheet metal of the corrugations in relation to the length of sheet may be varied as the heat dissipation requirements vary. Moreover, spacers other than the particular arrangement 61, 63 described above are within the scope of this invention. For example, instead of dual bosses 61 on each alternate corrugation there could be a single boss centrally located on alternate spacers, or there could be spacers other than bosses on each corrugation in a staggered relation to each other, etc. The same is true of the lower spacers 63. Other convenient means for obtaining this spacing will be apparent to those skilled in the art. It should also be understood that units 49 are useful for other inductor members and for eddy-current couplings wherein the inductor member is not the inner member.

The term sheet-like drum-supporting members as used in the following claims is intended to refer to any member such as 47 which has connections between the hub 45 and the inductor drum member 9 lying essentially in a plane.

Among the advantages of the invention are the following:

The segmental form of the inductor 41 (see segments 43 separated by slots 67) provides for freedom of expansion of the segments under conditions of heating by eddy currents during operation without substantially increasing the effective diameter of the drum 41 as a whole. In other words, strains occur more or less peripherally instead of radially, and hence the air gap between drum 41 and teeth 31 and 33 is maintained fairly constant at all operating temperatures. This effect is augmented by the fact that certain of the S-shaped webs 47 support the segments 43 by adjacent connections at the slots 67, the peripheral strains being delivered to the webs 47.

Moreover, the heat dissipating units 49, although heat bonded at their outer folds to the segments 43, may flex by reason of their form and the fact that they are not heat bonded at their inner folds. It may also be noted that relatively high temperatures are involved in the formative heat bonding of the units 49 to the drum 41, but these temperatures are not applied to the hub portions. The S-shaped construction of the webs 47 prevents excessive stresses under such formative conditions.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An inductor drum construction for electrical machines comprising spaced hub and surrounding segmental eddy-current drum members, the drum being slotted to provide its segments, web members connecting said spaced members and including portions joining adjacent segments at the slots, and accordion folded flexible-metal heat dissipating means located between said spaced members and between the web members, the outer folds only of said heat dissipating means being heat bonded primarily to the segments of the drum.

2. An inductor for electrical machines comprising an inner hub and a surrounding outer cylindric eddy-current drum spaced therefrom, said drum having angular slots dividing it into segments, webs extending from the hub and connecting with the segments adjacently at the slots, accordion folded flexible-metal heat dissipating strip means located between said hub and said segments and attached only to the latter, said strip means lying also between said webs.

3. An inductor for electrical machines comprising an inner hub and an outer cylindric eddy-current drum spaced therefrom, said drum having angular slots dividing it into segments, S-shaped webs extending from the hub and connecting with the segments adjacently at the slots, accordion folded flexible-metal heat dissipating strip means located between said hub and said segments and between adjacent webs, said strip means being heat bonded to said segments and unbonded with respect to the hub.

4. An inductor for electrical machines comprising an inner hub and an outer cylindric eddy-current drum spaced therefrom, said drum having angular slots dividing it into segments, S-shaped web portions connecting the hub with the segments, at least some of which web portions form connections between segments at the slots, a plurality of individual accordion folded flexible-metal heat dissipating strips located between said hub and said segments, said strips being compressively sprung into position between adjacent webs and heat bonded only to said segmental drum.

5. In an electrical machine, a heat dissipating construction for a rotary member that is subjected to heating, comprising a central hub, a coaxial generally cylindric drum spacedly surrounding the hub, drum-supporting members fastened to the hub and to the drum, said supporting members being relatively widely spaced but constituting the primary support for the drum, and sheet metal cooling fin assemblies heat conductively attached only to the inner surface of the drum between the supports, said assemblies having radial sheet components, said component sheets of the cooling fin assemblies being closely spaced peripherally compared to the peripheral spacing of the drum-supporting members.

6. In an electrical machine, a heat dissipating construction for a rotary member that is subjected to heating, comprising a central hub, a coaxial generally cylindric drum spacedly surrounding the hub, drum-supporting members fastened to the hub and to the drum, said supporting members being relatively widely spaced but constituting the primary support for the drum, and flexible radially corrugated sheet metal cooling units having inner and outer folds, the outer folds being bonded in heat conductive relation to the inner surface of the drum, the corrugations of the units being closely spaced relative to the spacing of the drum-supporting members.

7. Apparatus as set forth in claim 6, wherein the corrugations of each fin unit substantially infill all of the peripheral extent between adjacent drum-supporting members.

8. Apparatus made according to claim 7, and wherein each unit is sprung into a sector shape between the drum and adjacent supports.

9. Apparatus as set forth in claim 6, wherein the drum is peripherally segmented by transverse slits.

10. Apparatus as set forth in claim 6, wherein the drum-supporting members are radially disposed and generally S-shaped, said supporting members being welded to the inner surface of the drum.

11. Apparatus as set forth in claim 6, wherein the drum is peripherally segmented by lateral slits, the drum-supporting members being arranged with portions thereof attached to adjacent segments at the slits, whereby the segments of the drum are adjacently supported at their ends by said drum-supporting members.

12. In an electrical machine, a construction for a rotary member that is subjected to heating, comprising a central hub, a coaxial generally cylindrical drum spacedly surrounding the hub, spaced sheet-like drum-supporting members fastened to the hub and bonded to the drum, the bonding being along lines of considerable length, the drum being peripherally segmented by slits to form segments, the bonding lines of the drum-supporting members and the slits being angularly arranged to extend across one another, each supporting member being joined to two segments except at a slit crossing, whereby expansion of the drum is peripheral without substantial diametral enlargement, the resulting relative movement between segments at the slits being applied as twist around axes generally in the planes of said supporting members.

RALPH L. JAESCHKE.

REFERENCES CITED

The following references are of record in the file of this patent:

UNITED STATES PATENTS

| Number | Name | Date |
|---|---|---|
| 606,912 | Blathy | July 5, 1898 |
| 1,043,047 | Goldschmidt | Oct. 29, 1912 |
| 1,200,501 | Jervey | Oct. 10, 1916 |
| 1,834,774 | Fischer | Dec. 1, 1931 |
| 1,942,211 | Hartwig | Jan. 2, 1934 |
| 2,374,203 | Holthouse | Apr. 25, 1945 |
| 2,454,364 | Winther | Nov. 23, 1948 |

FOREIGN PATENTS

| Number | Country | Date |
|---|---|---|
| 182,896 | Great Britain | July 10, 1922 |
| 320,279 | Great Britain | Oct. 10, 1929 |